United States Patent
Brooks et al.

[11] Patent Number: 5,825,869
[45] Date of Patent: Oct. 20, 1998

[54] CALL MANAGEMENT METHOD AND SYSTEM FOR SKILL-BASED ROUTING

[75] Inventors: Nancy Sinling Brooks, Markham; Paul Douglas Fryer, Toronto; Gary Stanley Kaufman, Thornhill, all of Canada; Stephen Phillip Berkson, Los Gatos, Calif.; Charles R. Herel, Pleasanton, Calif.; Laura M. Brooks, Sunnyvale, Calif.

[73] Assignee: Siemens Business Communication Systems, Inc., Santa Clara, Calif.

[21] Appl. No.: 636,610

[22] Filed: Apr. 23, 1996

Related U.S. Application Data

[63] Continuation-in-part of Ser. No. 427,546, Apr. 24, 1995, abandoned.

[51] Int. Cl.⁶ .................................................. H04M 3/00
[52] U.S. Cl. .......................... 379/265; 379/266; 379/309
[58] Field of Search ................................ 379/265, 266, 379/309, 201, 210, 211, 212

[56] References Cited

U.S. PATENT DOCUMENTS

| | | | |
|---|---|---|---|
| 5,046,088 | 9/1991 | Margulies | 379/211 |
| 5,206,903 | 4/1993 | Kohler et al. | 379/309 |
| 5,309,513 | 5/1994 | Rose | 379/265 |
| 5,396,542 | 3/1995 | Alger et al. | 379/265 |
| 5,592,542 | 1/1997 | Honda et al. | 379/265 |
| 5,594,791 | 1/1997 | Szlam et al. | 379/265 |

OTHER PUBLICATIONS

Dawson, Keith, "The Smart Way to Handle Incoming Callers," *Inbound/Outbound Magazine*, May 1990, pp. 22, 24, 27, 28, 30, 31, 32 and 34.

*Primary Examiner*—Ahmad F. Matar

[57] ABSTRACT

A call-management method and system for distributing calls to individuals, such as ACD agents, include storing a resume for each individual. In the preferred embodiment, each resume includes first data indicative of call-handling capabilities of the individual and includes second data indicative of preferences of the call-management system for particular individuals to process particular types of calls. When an inbound call is received or an outbound call is generated, the call is tagged with identification of abilities advantageous to processing the calls. Thus, the desired skills for a call may be correlated with either or both of the call-handling capabilities of the individuals and the call-management preferences. Again referring to the preferred embodiment, "tagging" each call is a step of associating a skill expression with each call and includes identifying two or more desired abilities for processing the call. Each call may be tagged with a number of related or unrelated skill expressions, each with a timeout value, thereby permitting routing criteria to be changed depending upon the time that the call has been in queue. The abilities may be designated as mandatory skills and optional skills, with the optional skills being disregarded or reduced in emphasis after the call has remained in a queue beyond a preselected time period. The resumes are stored in an adjunct server that facilitates generating quality of service reports.

19 Claims, 5 Drawing Sheets

CALL MANAGEMENT METHOD AND SYSTEM FOR SKILL-BASED ROUTING

CROSS REFERENCE TO RELATED APPLICATION

This is a continuation-in-part application of U.S. patent application Ser. No. 08/427,546, filed Apr. 24, 1995 (now abandoned).

TECHNICAL FIELD

The invention relates generally to call-management methods and systems for distributing calls among a collection of individuals and more particularly to distributing telephone calls to agents based upon the individual call-handling capabilities of the agents.

BACKGROUND ART

Call centers are organizations set up by companies and individuals to handle large volumes of telephone-based business transactions. Call centers provide an efficient alternative to performing business transactions with customers in a face-to-face manner. For example, rather than renting one or more commercial spaces in shopping areas in order to retail merchandise to the general public, a company may mail out catalogs which advertise a telephone number that can be used for ordering the merchandise. Customer calls are handled by agents of the company.

There are many organizational styles for call centers. Typically, the necessary telecommunications equipment includes an automatic call distribution (ACD) system that provides call management. The system may be physically located on the premises of the company, or may be on the premises of a central service provider, such as a regional telephone company. The ACD agents may all be employees of the company, or may be employees of a business enterprise that provides call-handling services to a number of unrelated companies. Conventionally, ACD agents are located at offices, but telecommuting agents are utilized as well.

Inbound transactions are calls initiated by customers and directed to ACD agents. On the other hand, outbound transactions are calls initiated by the agents to customers or prospective customers. In addition to the sale of retail merchandise, call centers and ACD systems are used for such applications as brokerage call management in the sale of stocks and bonds, product support call management to provide information regarding products of a company, and utility customer service call management for handling questions regarding service and billing.

ACD systems experience high traffic periods and low traffic periods. Consequently, ACD systems must be capable of automating two major decisions. The first major decision may be referred to as the "agent selection decision," i.e., when more than one agent is available to handle the next transaction, which agent should be chosen? The second major decision may be referred to as the "transaction selection decision," i.e., when more than one transaction is waiting for the next available agent and an agent becomes available, which transaction should the agent handle?

One approach to the agent selection decision is to set up a sequencing scheme, so that the switch of the ACD system follows the same sequence of agents until the first available agent in the sequence is found. The concern with this approach is that it creates "hot seats," i.e. an inequitable distribution of inbound calls to ACD agents who are high in the sequence. Most current ACD systems solve the agent selection decision by using a longest-idle-agent approach to provide a more equitable distribution of transactions.

There are also different approaches to the transaction selection decision in which there are more available transactions than there are ACD agents. One approach is to create one or more first-in, first-out (FIFO) queues. Under this approach, each transaction may be marked with a priority level by the switch of the ACD system. When an agent becomes available, the transaction with the highest priority is routed to the agent. If several calls of equal priority are waiting in a queue, the call which has been waiting the longest is routed to the available agent. If the call center conducts outbound transactions, each transaction is similarly submitted to a FIFO queue with a priority designation, with the switch routing transactions from the queue to the agents.

The longest-idle-agent approach and the FIFO approach function well in applications having little variation in the types of transactions being handled by the ACD agents. If all agents can handle any transaction, these approaches provide a sufficiently high level of transactional throughput, i.e., the number of transactions handled by the call center in a particular time interval. However, in many call center environments, the agents are not equally adept at performing all types of transactions. For example, some transactions of a particular call center may require knowledge of a language other than the native language of the country in which the call center is located. As another example, some transactions may require the expertise of "specialists" having training in the specific field to which the transaction relates, since training all agents to be knowledgeable in all areas would be cost-prohibitive. For ACD applications in which agents are not equally adept at performing all transactions, there are a number of problems which at least potentially reduce transactional throughput of the call center. Three such problems may be referred to as the "under-skilled agent" problem, the "over-skilled agent" problem, and the "static grouping" problem.

The under-skilled agent problem reduces transactional throughput when the switch routes transactions to ACD agents who do not have sufficient skills to handle the transactions. For example, a call may be routed to an English-only speaking person, even though the caller only speaks Spanish. In another example, the transaction may relate to product support of a particular item for which the agent is not trained. When this occurs, the agent will typically apologize to the customer and transfer the call to another agent who is capable of helping the customer. Consequently, neither the agent's nor the customer's time is efficiently utilized.

Inefficient utilization is also a concern related to the over-skilled agent problem. A call center may have fixed groupings of agents, with each group having highly trained individuals and less-experienced individuals. Call-management may also designate certain agents as "specialists," since it would be cost prohibitive to train all agents to be experts in all transactions. Ideally, the highly skilled agents handle only those transactions that require a greater-than-average skill level. However, if a significant time passes without transactions that require highly skilled agents, the agents may be assigned to calls for which they are over-qualified. This places the system in a position in which there is no qualified agent for an incoming call requiring a particular expertise because the agents having the expertise are handling calls that do not require such expertise. Again, the transactional throughput of the call center is reduced.

Current ACD systems allow agents to be grouped according to training. For example, a product support call center may be divided into four fixed, i.e., "static," groups, with each group being trained in a different category of products sold by the company. There are a number of potentially negative effects of static grouping. Firstly, the call center management must devise some configuration of agents into groups. This may be a costly process requiring extensive analysis and data entry. Secondly, the configuration that is devised is not likely to be optimal in all situations. The pace and mix of transactions will change during a typical day. At different times, the adverse effects of the under-skilled agent problem and the adverse effects of the over-skilled agent problem will vary with respect to the transactional throughput of the call center. Thirdly, when a new product is released, the devised configuration likely will be less valuable. In response to changes in the size, pace and mix of the transaction load over the course of time, call management must monitor and adjust the performance of the current grouping configuration on an ongoing basis. When trends are detected, the grouping configuration should be changed. This requires the time and attention of call center managers and supervisors. Again, the transactional throughput is reduced.

U.S. Pat. No. 5,206,903 to Kohler et al. describes ACD equipment which continues to use static grouping. Each static group of agents is referred to as a "split," and each split is associated with a different queue. The agents are assigned to splits according to skills. Within a single split, the agents may be limited to knowledge of different subtypes of transactions. Preferably, there is at least one agent in each split who is trained to handle calls of any of the subtypes within the particular split. This "expert" may also be trained to efficiently handle calls of other types, i.e., other splits. Each agent possesses up to four skill numbers that represent various abilities of the agent with respect to handling transactions related to subtypes and types of transactions.

The ACD equipment of Kohler et al. assigns each incoming call three prioritized skill numbers that estimate skill requirements of the incoming call. The skill numbers of the incoming call are considered "prioritized," since they are viewed sequentially in searching for a match of the call with an agent, so that the second skill number of the call is unnecessary if a match is found using the first prioritized skill number.

The incoming call is assigned the one, two or three prioritized skill numbers and is placed in the appropriate queue of the appropriate static group of agents. A search is made among the available agents for an agent-skill number that matches the first skill number of the call. If no match is found after a predetermined time delay, the second prioritized skill number of the call is used to find a match. If no match is found after a second predetermined time delay, the third prioritized skill number is considered. Then, if no match is still found, the ACD equipment of Kohler et al. expands the search of available agents to other groups of agents.

While the Kohler et al. patent does not directly address the problems associated with static groups, it does consider the skills of the individual agents. The prioritized skill numbers assigned to the incoming calls are logically ordered. The patent refers to the first skill number of a call as the primary call-skill indicator. This primary indicator is used to define the minimal skill level that is required for an agent to competently handle the call. Consequently, if a match is made with the primary indicator, the ACD agent may not be over-skilled or under-skilled. However, if the search is unsuccessful, the secondary call-skill indicator is utilized. The search for a match to the secondary indicator may cause the call to be routed to an agent having more than the minimal required skill. The third prioritized skill number that is assigned to the incoming call is referred to as the "tertiary" call-skill indicator. The tertiary indicator is yet another skill level beyond what is minimally required to competently handle a call. Since the tertiary indicator is utilized only if a match is not found for either of the primary or secondary indicators, an overly skilled agent of the appropriate group will handle the call only if that agent is the only available capable agent.

Stated briefly, Kohler et al. teaches that a search for a call-to-agent match includes a first series of steps in which the skill level varies at each step (but with the search being limited to a single group of agents) and includes a second series of steps that opens the search to other groups of agents. This reduces the frequency of highly skilled agents handling a call when a lesser-skilled-but-competent agent is available to handle the call. However, the over-skilled agent problem remains, since the static grouping limits the number of agents who are being considered during execution of any one step. This may result in a call-to-agent match being made when a lesser-skilled-but-competent agent is available. Moreover, the stepped searching of Kohler et al. within the first group is limited to a single factor, since the prioritized skill numbers assigned to the call are sequentially "viewed." As a result, if more than one agent skill must be considered in matching a call to an agent, additional groups must be created. As an example, Group B that is formed to provide product support for product B may need to be subdivided into subgroups in accordance with capabilities of handling calls requiring knowledge of different languages. This subgrouping increases the susceptibility of the system to the adverse effects of static grouping, as previously described.

What is needed is a call-management method and system that further reduce the frequency of over-skilled and under-skilled call handling, with the method and system preferably being implemented without static grouping of agents. Furthermore, what is needed is such a method and system which can be implemented without requiring significant modification to switching circuitry that is dedicated to a call center. Preferably, the method and system provide improved quality-of-service report generation and operate equally well for an application in which there are multiple free agents and a single call in queue and an application in which there is a single free agent and multiple calls in queue.

SUMMARY OF THE INVENTION

A call-management method and system for distributing calls to a plurality of individuals, such as automatic call distribution (ACD) agents, include routing calls to the individuals based upon a correlation of attributes of the individuals with calls that are tagged with identification of abilities that are advantageous to efficiently processing the calls. That is, for each call that is to be distributed, one or more skills that are relevant to efficient handling of the call are determined and then used to route the call to an appropriate individual. In one embodiment, the attributes of the various individuals are in two forms and each attribute of an individual is assigned a level indicative of the ability or preference of the individual with respect to types of calls. In the first form, first data is indicative of levels of proficiencies of the individuals with respect to processing various types of calls (e.g., product-related and/or language-related capabilities). In the second form, second data is indicative of call-management preferences for particular individuals to process particular calls (e.g., calls from a specific customer). In this embodiment, the correlation of the attributes of the individuals to the requirements of calls allows the selection of the first data, the second data, or a combination of the first and second data as the basis for the correlation.

The method and system preferably utilize more than one call-handling need of a call in the selection process for routing the call to a particular individual. The call-handling needs are identified in a skill expression that is formed for each call. Preferably, the call-handling needs are linked by the logical operatives "AND," "OR" and "NOT" (in the practice of the invention, symbols that are the functional equivalents of the terms may be employed as these three terms). The logical operative "AND" permits multiple call-handling needs to be utilized collectively and simultaneously to select an ACD agent. The logical operative "OR" permits selection based upon alternative call-handling needs, while the logical operative "NOT" allows the routing decisions to include systematically ruling out certain ACD agents from consideration.

In the application of the call-management method and system for use in ACD applications, the first and second data are preferably stored in an adjunct routing server. The adjunct server is separate from the switching circuitry of a call center. In this embodiment, the call-management scheme can be reconfigured to meet changing needs without significantly affecting the system administration. Moreover, the generation of quality of service (QoS) reports is facilitated.

The adjunct routing server stores the first data in the form of resumes. An agent resume is a formal listing of the skills that an agent possesses. The resume includes both the level of ability achieved in each skill, i.e. the rating with respect to a call-handling capability of the agent, and the levels of the call-management preferences for the agent, i.e. the importance that the system administrator assigns to the skills of the agent.

Each call is associated with a skill expression that identifies the skills that are relevant to efficient handling of the call. As previously noted, the preferred embodiment is one in which more than one relevant skill is identified, so that all of the factors that determine a "best" agent for handling a call can be considered. The relevant skills may be determined using different techniques. Automatic number identification (ANI) may be used to ascertain information regarding the calling party, while dialed number identification service (DNIS) may be used for information regarding the called party. Additional information may be gathered by means of interactive voice response (IVR) input and database lookups. For example, customer database retrieval allows call-management to determine a customer history and customer preferences.

The skill expression of a call includes the required skills and skill levels for efficiently handling the call. In one embodiment, the skills may be divided into two categories: mandatory and optional skills. Mandatory skills are those skills that an agent must possess in order to handle the call, even if the call remains in queue for an extended period of time. Optional skills are those that are considered in the selection of the appropriate agent until the call reaches a predefined priority threshold. For example, the optional skills may be considered until the call has reached a predetermined time limit, after which the optional skills are no longer required. A call in queue is assigned a priority class and a priority level. As time elapses, the priority level associated with the call increases. Calls with higher priority classes and priority levels are handled first, thus minimizing the wait time of the calls in queue. Calls that are considered to be more important are handled first. In an embodiment that does not include designation of mandatory and optional skills, the skill expression that "tags" a particular call systematically changes when a preselected period of time elapses. Following each lapse of the time period, a timeout skill expression is implemented in a search for an agent-to-call match. In some applications, a timeout skill expression in a sequence of expressions is unrelated to the original skill expression. For example, after three periods of time have elapsed with a different skill expression after each timeout, the skill expression may be one that causes selection of a customer relations agent who may not have the skill to handle the call, but is skilled in maintaining good customer relations.

The selection of an available agent is based upon the skill expression of a call. In the preferred embodiment there are four possible approaches: consider only the call-handling capabilities of individual agents, consider only the call-management preferences established by call center management, consider the call-handling capabilities first and use the call-management preferences to further narrow the selection process when necessary, and consider the call-management preferences and utilize the call-handling capabilities only if necessary to further narrow the selection process. Once an agent is selected by one of the four approaches, the call is routed directly to the selected agent.

The QoS reports are generated to indicate the effectiveness of the call-management method and system. An agent summary report is organized according to the activities of particular individuals, i.e. agents. A skill summary report organizes the data by skill expressions, rather than by agents. This report may list the number of calls enqueued for selected skill expressions and the average time spent on those calls for selected agents during specific time periods. A match analysis report summarizes all calls received by skill expression and shows the abandon rate per skill expression, which skill expressions are being requested most often, and the level of service provided for each skill expression. Each of the reports utilizes scores that are indicative of the closeness of matching levels of call-handling needs with the levels of call-handling skills possessed by the agents to whom calls are routed. As will be explained more fully below, the "closeness" of a match is determined by comparing a number that is assigned to indicate the desired level of expertise regarding a call-handling need of a particular call with a number that is assigned to indicate the level of expertise possessed by the agent with regard to handling calls having the particular need. Since each skill expression identifies more than one call-handling need, the score for a call will depend upon more than one comparison of such numbers.

An advantage of the invention is that all agent selection decisions and all transaction selection decisions are based upon the call-handling capabilities of the agents and/or the call-management preferences of the system. That is, when there is a number of available agents to handle a single call and when there is a single agent to handle a number of calls in queue, the routing of a call to an agent is determined by factors that are designed to ensure a high level of customer satisfaction and transactional throughput. A theoretical framework is provided that allows call center management to formally postulate which agent is the "best" agent to process a call in the absolute sense (i.e., when no other calls are pending in the center and all agents are available) and which agent would be the "best" in a particular context (i.e., when the center is under a particular transactional load, with some or all of the agents processing other calls). Using this theoretical framework also permits a quantification of over-skilled and under-skilled connectivity.

Another advantage of the invention is that it is not necessary to assign agents to groups in order to achieve an optimal level of transactional throughput. Since the method and system are capable of simultaneously considering more than one call-handling need of a skill expression of a call, grouping the agents is not a requirement for reaching a high level of transactional throughput. For this reason, all of the initial setup and any ongoing administration involved in the configuration of agents into separate ACD groups can be avoided. Moreover, the ability to systematically change skill expressions based upon time allows skill expressions of "starved" calls to be unrelated to the original skill expression of the call and to instead reflect perceived changes in the needs for properly handling the call. The ability is not available in prior art methods and systems. A further advantage is that the use of an adjunct routing server enables use of the invention without requiring modification of the switching circuitry of the call center. Moreover, the generation of various types of QoS reports is facilitated. By calculating scores indicative of the closeness of matching levels of call-handling needs with levels of call-handling skills, call center management is able to evaluate QoS to clients by means of a quantitative comparison that goes beyond prior art QoS evaluations based merely on speed of service.

BEST MODE FOR CARRYING OUT THE INVENTION

Figure 1:
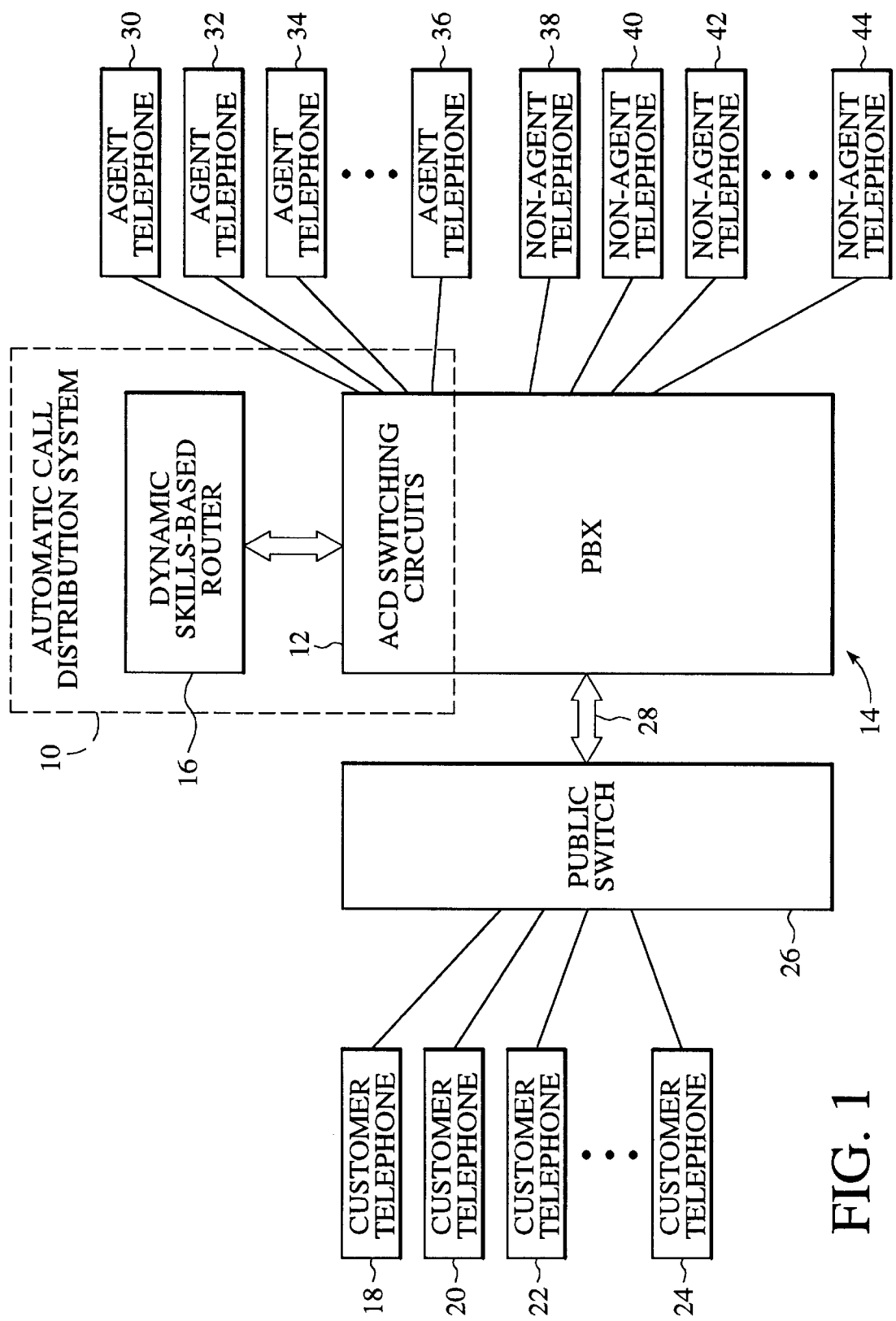
FIG. 1 is a functional block diagram of a telecommunication system that implements the preferred embodiment of the invention.

With reference to FIG. 1, an automatic call distribution (ACD) system 10 includes switching circuitry 12 of a private branch exchange (PBX) 14 and an adjunct router 16. The telecommunication system of FIG. 1 permits inbound telephone calls (transactions) from customers to agents of a call center, as well as outbound telephone calls from the agents to customers. A number of customer telephones 18, 20, 22 and 24 are connected to a public switch 26 that is connected to the PBX 14 by means of a trunk 28, as is well known in the art. Also shown in FIG. 1 are a number of telephones 30, 32, 34 and 36 for use by ACD agents. The PBX also supports other telephones 38, 40, 42 and 44 that are used by persons that are not ACD agents, but who are also employed at the calling center that operates the ACD system 10. The non-agent telephones are not critical to the invention. With the exception of the adjunct router 16, the components of FIG. 1 are contained within conventional telecommunication systems having ACD capability.

In general terms, ACD agents use the agent telephones 30, 32, 34 and 36 to receive and/or place telephone calls between a call center that employs the agents and the customer telephones 18–24. For example, a customer may use a home telephone 20 to place a telephone call to the company to order one of the company's products. The customer dials a general sales telephone number of the company. The public switch 26 routes the inbound telephone call to the PBX 14. The PBX then routes all inbound calls that are directed to the general sales telephone number to the ACD system 10 for rerouting to one of the individuals at the agent telephones. The adjunct router 16 selects the appropriate agent telephone in a manner to be described below.

The adjunct router 16 is a dynamic skill-based component that controls the ACD switching circuitry 12 to route inbound calls to selected agents at the telephones 30–36. The selected agent receives the inbound call and processes the transaction.

The adjunct router is carried out in a combination of computer hardware and software. The adjunct router may be physically implemented in a stand-alone computer that interfaces with the PBX 14, or may be physically attached to the PBX. In the preferred embodiment, the router is a separate component in order to facilitate installation and maintenance of the adjunct router. However, the inventive method may be carried out within an implementation in which the router is not an adjunct component, but is instead installed within the conventional components of a PBX and ACD system.

Figure 2:
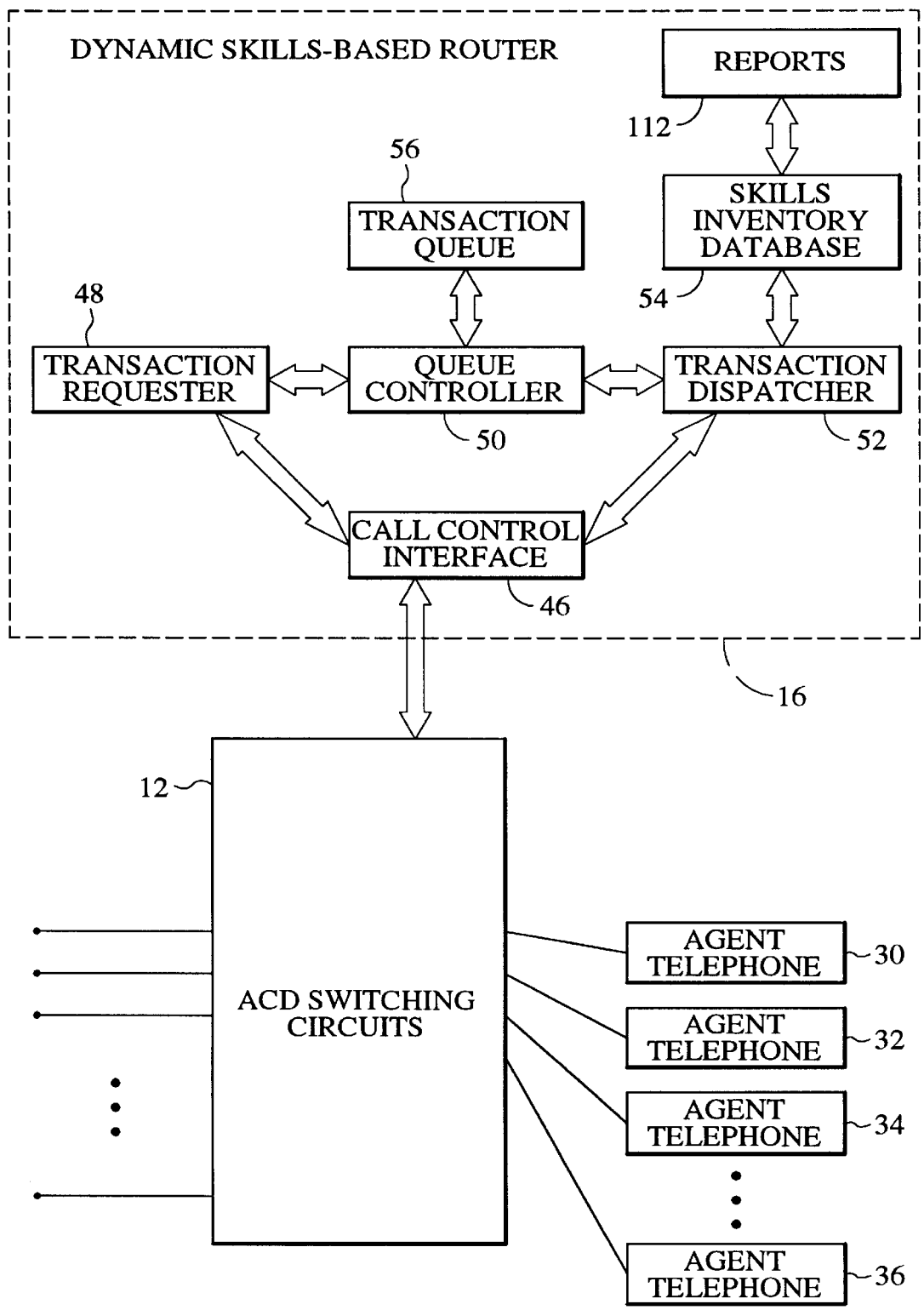
FIG. 2 is a functional block diagram of a call center and an automatic call distribution system implementing a preferred embodiment of the invention of FIG. 1.

Referring now to FIG. 2, the adjunct router 16 includes a call control interface 46 that establishes the coordination with the switching circuitry 12 of the ACD system. The call control interface may be a standard CSTA interface. A transaction requester 48, a queue controller 50, and a transaction dispatcher 52 may be separate routines of a computer program that establishes the router. A skills inventory database 54 may be stored on a hard disk and read into random access memory upon execution of the program. A transaction queue 56 may also be generated in random access memory during the execution of the program.

The adjunct router 16 may be used to control inbound or outbound calls or a combination of inbound and outbound calls. For example, if an outbound call is to be routed to a particular customer, the request will be received at the transaction requester 48 via the call control interface 46. Inbound or outbound calls are queued at the transaction queue 56. The transaction dispatcher 52 is used in the selection of a particular ACD agent for handling a queued call. As will be explained more fully below, the selection is determined by matching call needs with agents skills and/or system preferences. The skills inventory database 54 stores a resume for each of the agents who utilize the agent telephones 30–36. The queue controller 50 coordinates operations involving transaction requests and transaction dispatches. When a queued call has been matched with a particular agent, the transaction dispatcher 52 causes the call control interface 46 to issue a command to the switching circuitry 12 of the PBX to route the queued call to the appropriate agent telephone corresponding to the selected agent. The transaction dispatcher also causes the queue controller 50 to delete the corresponding entry in the transaction queue 56.

For each ACD agent, a resume is formed and stored at the skills inventory database 54. A resume is a formal listing of the skills that an agent possesses. The resume describes both the level of ability, i.e. expertise, in each skill and the level of preference that call management has for the agent to handle transactions that require particular skills versus transactions that require other skills.

In the preferred embodiment, the skills inventory database 54 is implemented using a relational data-base model. Therefore, the database may include several tables of definitions, such as a skills table, an agents table and a resume-details table.

Figure 3:
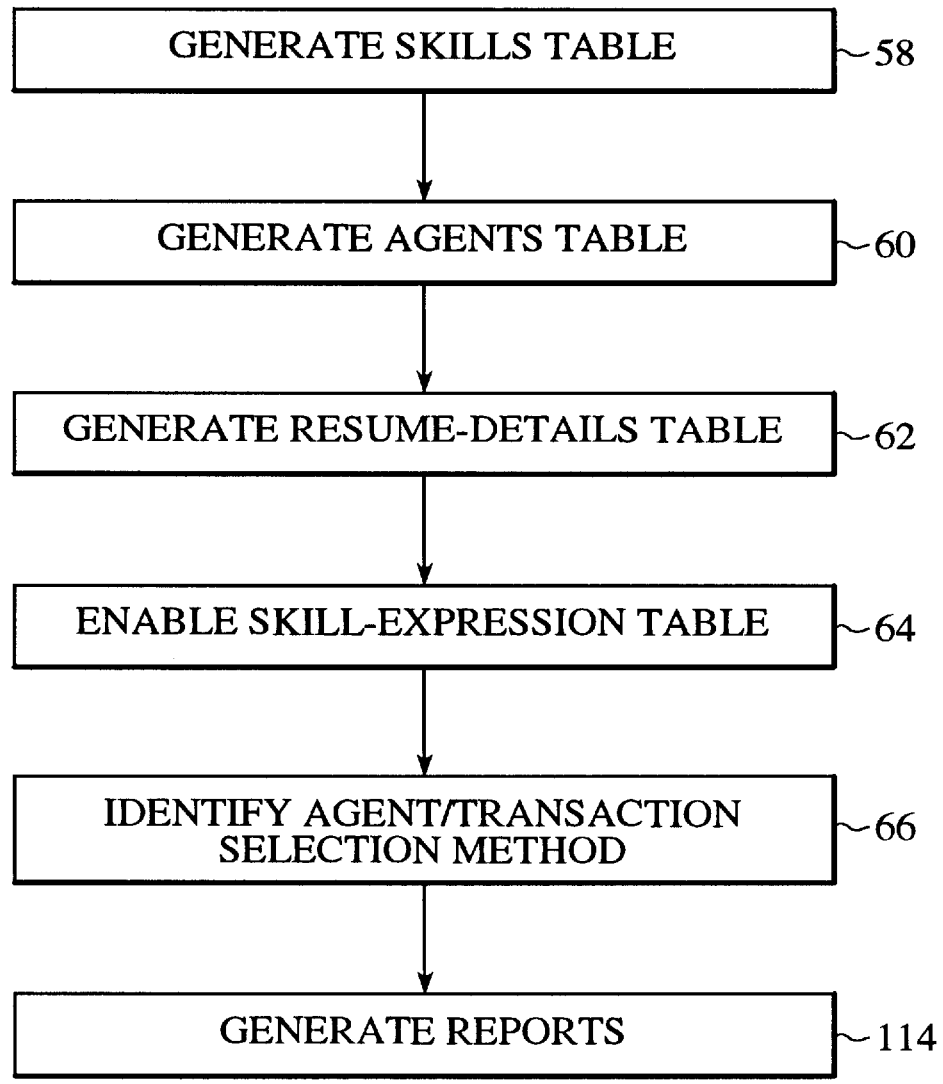
FIG. 3 is a flow chart of steps for establishing data for executing routing decisions in accordance with one embodiment of the invention.

Referring now to FIG. 3, a first step 58 is to generate the skills table. In one embodiment, the skills table contains a list of all of the valid values for a "skill" relevant to handling calls of the ACD system. A "skill" is a job or area of expertise in which an agent has competence or experience. A "skill" may be further defined as being unique to an individual or common to various individuals. This skill commonality may be considered as creating a "team." For example, a team may be formed by designating a skill as "sales" and assigning a skill level from 1 to 9, with an agent having a skill level of 1 being considered a novice and an agent who has achieved a skill level of 9 being considered a team leader. However, the creation of teams is not equal to the static grouping of conventional call-management methods and systems. Individual agents may be members of any number of teams, provided the skill code for each team is included in the agent's resume. The creation of teams by means of the generation of a skills table allows call management to capture the advantages of conventional ACD groups, without the limitations of static grouping.

In step 60, the agents table is generated. This table contains a list of all of the agents of the ACD system and stores important data regarding each agent. A ResumeCode field is used to access agent resumes. Specifically, associated with each agent in the agents table is a ResumeCode field that can be used as an identifier of the agent when the agents table is queried to look up the skills of the particular agent. The resume-details table is generated at step 62. This table details the identifier of each skill in order to reference back to the skills table and details the agents ResumeCode to reference back to the agents table. In addition, the resume-details table contains skill levels, skill preferences and excluded flags. A skill level is the level of knowledge or expertise that a particular agent has achieved in a given skill. That is, the skill itself is identified in the skills table generated in step 58 and the rating is identified in the resume-details table. While not critical, the skill levels may be ratings on a scale of 1 to 9, with 9 indicating the greatest level of expertise.

A skill preference is a relative weighting of the call-management's desire to have a particular agent handle transactions requiring a particular skill or relating to a particular customer. Skill preferences can be used to reserve uniquely qualified agents for handling calls that require particular expertise. As an example, the first agent may possess three skills: SKILLA, SKILLB, and SKILLC. If many other agents have been well trained to handle transactions requiring SKILLA and SKILLB, but only the first agent has SKILLC, the system might place a high preference on SKILLC for the first agent. Thus, only when no transactions are enqueued requesting SKILLC will the first agent handle calls requesting SKILLA or SKILLB. Skill preferences may be rated on a scale of 1 to 9, with 9 indicating the greatest preference of call-management for the agent to handle calls requiring the skill.

Excluded flags may be identified in the resume-details table to denote whether or not a particular skill is an "excluded skill" for a particular agent. Excluded skills are skills in the agent's resume that the agent is not permitted to handle under any circumstances. As an example, in a commission-based sales organization, it may be necessary to restrict certain individuals from handling a type of call that requires proper professional certification.

In addition to the three tables formed in steps 58, 60 and 62, the skills inventory database 54 of FIG. 2 stores information regarding abilities that are advantageous to processing individual calls. FIG. 3 identifies an enabling step 64 of forming a skill-expression table. In one embodiment, this table stores a "skill expression" for each uncompleted transaction that is currently being handled by the ACD switching circuitry 12. Thus, each call within the transaction queue 56 is associated with at least one skill expression within the skills inventory database 54. Each call may also be associated with a call priority. A "skill expression" is a simple formalism for stating the skills that are required or advantageous to processing the associated call. The skill expressions may obey a context-free grammar, but the format is not critical to the invention. An example of a skill expression is: SPANISH,5 AND STOCKS,5 AND BONDS,2. This expresses a requirement for an agent with at least a "5" level of expertise in Spanish, who also has at least a "5" level of expertise in the skill of stocks, and who has at least a "2" level of expertise in the skill of bonds. In addition to the "AND" operator, "OR" and "NOT" operators may be utilized, or characters may be substituted for the three operators.

In one embodiment, skill expressions allow for a designation of call-handling capabilities as being "mandatory" or "optional." Moreover, the call priority of a call in queue is periodically changed (i.e., increased). This provides call-management with the flexibility of manipulating the same type of call in different ways, depending upon the length of time that a customer has been waiting. For example, both the mandatory and optional call-handling capabilities may be considered in the selection of the appropriate ACD agent until a predetermined period of time has elapsed in which the call has been stored in queue. After the time has elapsed, e.g. 60 seconds, the optional call-handling capabilities are no longer considered or may be reduced in importance. This reduces the "closeness" of the call-to-agent match, but also reduces the likelihood that the caller will terminate the call before a match is found. The mandatory and optional call-handling capabilities may be contained within a single skill expression or may be formed in separate skill expressions. A mandatory skill expression is an expression that describes those skills that are always required for an agent to process the call. An optional skill expression is an expression that describes those skills that call-management would prefer that an agent possess for handling the call, but which are not mandatory for successful processing of the call.

In another embodiment, the designation of mandatory and optional call-handling capabilities is eliminated. Instead, each call is tagged with a sequence of skill expressions in which each expression is implemented only when the implementation of the prior expression has timed out in the search for an acceptable call-to-agent match. This sequencing of skill expressions allows implementation of "timeout" skill expressions that are completely unrelated to the original skill expression in the sequence. For example, the final expression in a sequence of six expressions may require an agent who is skilled with respect to maintaining positive customer relations, regardless of the skills of the agent that relate to original call-handling needs.

Another setup step 66 requires identification of an agent selection method. That is, call-management can select among a skills-only method, a preference-only method, a primarily-skill method and a primarily-preference method. Each one of these methods is based on the assumption that each agent in the system has a resume in the skills inventory database 54 of FIG. 2 and that each call (inbound or outbound) has an associated skills expression. In the implementation of these methods, skill scores and preference scores are calculated. A "skill score" is indicative of the correlation between the attributes of the agents and the desired abilities for handling a particular call. That is, in this embodiment the skill score is a numeric measure of how well a particular agent's resume matches the skill expression associated with the call. The closer that the skill score is to 0, the better the match in terms of transactional throughput of the system, since the selected agent will not be over-qualified or under-qualified. A positive skill score indicates an over-qualified agent, while a negative skill score indicates an under-qualified agent.

In the same embodiment, the "preference score" is a quantitative measure of the "preference" that call-management has for a particular agent to handle a particular call. For example, there may be a strong preference for having Agent1 handle all transactions involving Customer12. The higher the preference score, the greater the desire of call-management to have that agent process that transaction over other types of transactions.

The two factors, skill score and preference score, can be combined in four different ways to produce four unique agent selection methods. In the skills-only method, only the agents' levels of skill are utilized, so that the call-management preferences are disregarded. Thus, for an agent selection decision (i.e. more than one agent is available to handle a call when the call arrives at the call center) the call is assigned to the agent with whom the skill expression of the call has the closest match with the skills of the agent. In a transaction selection decision (i.e. more than one call is waiting in queue when an agent becomes available to handle a call) the agent will be assigned to the transaction with which the skills of the agent have the closest match (i.e., a skill score=b 0) to the desired call-handling abilities desired for processing the call. This method is most desirable when call-management does not include preferences for call-to-agent matches, the agents have significantly different levels of expertise in various call-handling capabilities, and incoming transactions have significantly varying skill requirements.

The preference-only method considers only call-management preferences for calls requiring specific skills or involving particular customers. Skill levels are not considered under this method. For an agent selection decision, the selection will be assigned to the agent who has a higher preference level for the skills advantageous to processing the call. For a transaction selection decision, the available agent will take that call over calls waiting in queue for which the agent has a lower preference level. This method is most desirable if skill levels are not important in a specific ACD application, call-management has strong preferences regarding which skills each agent should be using to handle calls, and incoming calls have varying skill requirements.

Referring now to the skills-first method, the skill-only method steps are followed, but if two or more agents have equal skill scores with regard to a particular call, the relevant preference scores are considered in determining the call-to-agent match. This method may be best utilized if the agents of an ACD system have different levels of expertise in different call-handling capabilities, the call-management preferences are considered less important for making routing decisions than the levels of expertise for the various skills, and incoming calls require different levels of expertise in various call-handling capabilities.

Finally, the preference-first method follows the same approach as the preference-only method, but if two or more agents have equal preference scores with regard to a particular call, their respective skill scores are utilized in the routing decision. However, all agents must satisfy skill scoring requirements in order to handle the call. This method is best employed when call-management preferences are considered more important for making routing decisions than levels of expertise for call-handling capabilities of agents, but the call-handling capabilities are still important.

Figure 4:
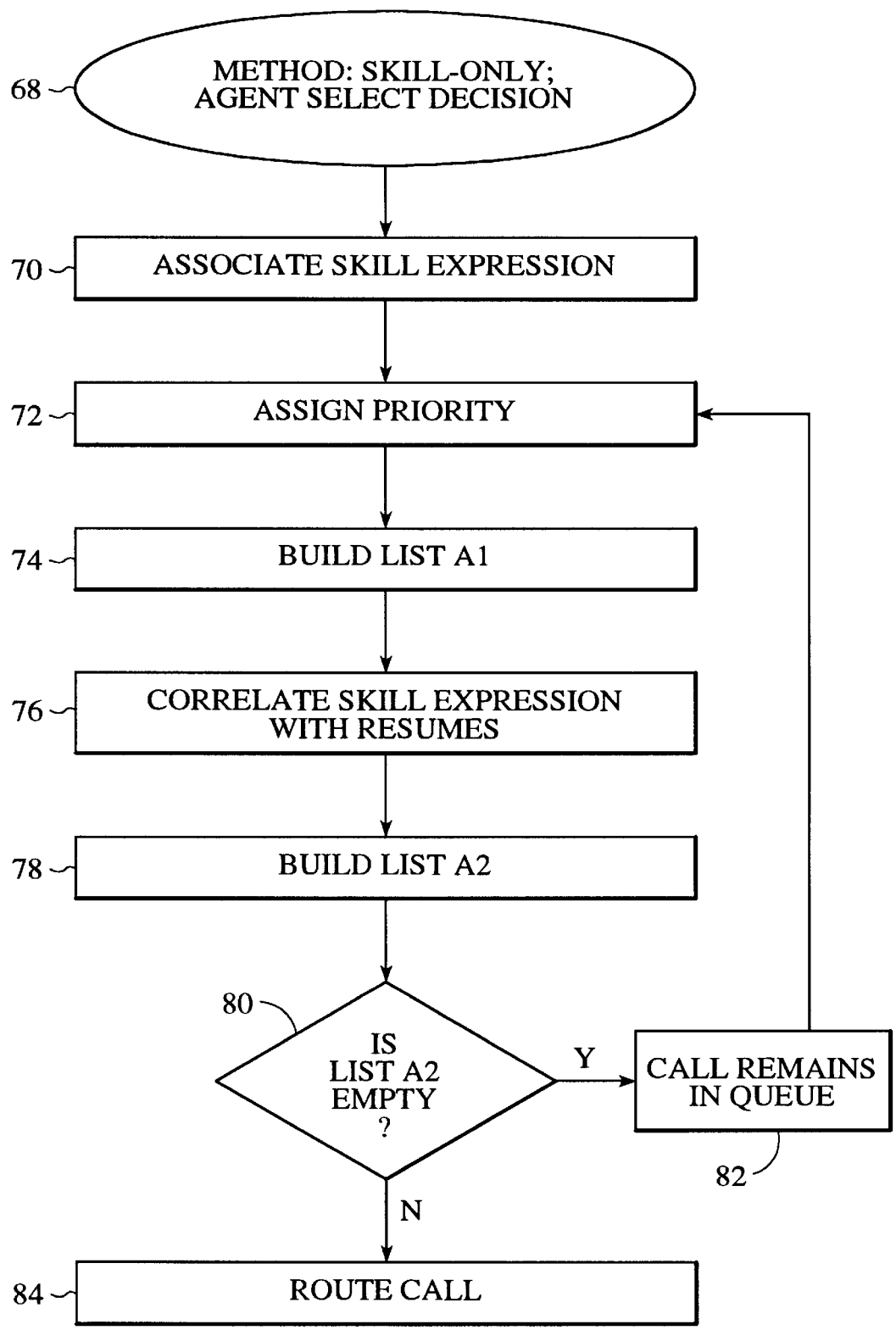
FIG. 4 is a flow chart of steps performed to execute an agent selection decision in which only the skills portions of agent resumes are utilized.

There is a total of eight types of routing decisions, since each of the four methods of skills-only, preference-only, skills-first and preference-first may be implemented in an agent selection decision or a transaction selection decision. To better describe the steps associated with these eight types, selected types will be fully described below and illustrated in the figures. With reference to FIG. 4, the skills-only method is described with reference to an agent selection decision 68. In step 70, a call is received associated with at least one skill expression. As previously noted, each call may have separate skill expressions that are utilized depending upon the time that the call has been in queue. Moreover, skill expressions include the logical operators "AND," "OR" and "NOT." The ACD system may collect information regarding a call in a variety of manners. Preferably, at least two sources of information are utilized. The known techniques of automatic number identification (ANI) and dialed number identification service (DNIS) may be employed to provide information regarding the calling party and the called party. Another source of information is interactive voice response (IVR) input. Call prompting may be accomplished by voice prompts or by dual tone multi frequency signaling. For example, account or personal identification numbers may be requested and input. Another possibility of information gathering is to employ customer database retrieval of customer histories, e.g. past purchases and credit record, or customer database retrievals of preferences, e.g. preferences of a specific agent.

As previously noted, each call may also be assigned a priority 72. This includes a priority class and an initial priority level. The priority class may be customer-specific, so that preferred customers receive faster response. The priority class remains constant, unless it is changed by call-management or an agent. On the other hand, the priority level for a particular call will increase as time elapses. Calls with higher priority class and priority levels are handled first, thus minimizing the wait time for calls in the queue. The priority level mechanism bears some similarity to approaches taken in conventional ACD systems, but includes significant differences. After a selected period of time (T), the priority level of a transaction (X) is increased from some initial level (P1) by an increment (i). Consequently, after the first interval, the priority level is P=P1+i, and after the second interval the priority level is P=P1+2i. The second interval may be longer or shorter than the first interval. Call-management may set a specially defined priority level called the starvation threshold. After a call has a priority greater than the starvation threshold, the call is considered to be starved for attention. When a call becomes "starved," optional skills are no longer necessarily utilized in determining a match for the call, or are reduced in significance. For example, the optional skills may be disregarded other than in selecting between agents who are "tied" with respect to matching mandatory skills of the skill expression. With less importance placed on the optional skills, a starved call is more likely to find a suitable agent.

A skill expression that is formed at step 70 may have as many as 100 identifications of abilities that are advantageous to processing the particular call to which the skill expression is associated. Each advantageous ability is associated with a rating, e.g. 1 to 9.

In step 74, a temporary List A1 of available ACD agents is created. If other calls are currently being processed, this temporary list will be a sublist of the total number of agents. In the preferred embodiment, the list is ordered in accordance with the amounts of time that the agents have been idle. Thus, if two or more agents are equally skilled with respect to handling a particular call, the default selection among the equally skilled agents will be for the longest idle agent.

List A1 is created each time that a call is to be routed to one of a number of available agents. In step 76, the skill expression that is associated with the call is correlated with the resumes of the agents in List A1. That is, those call-handling capabilities that are identified in the skill expression are compared to the call-handling capabilities of the agents identified in List A1. In the embodiment described above, the correlation is a calculation of a skill score for each of the agents. In the previously stated example, an inbound call to a brokerage call center was associated with a skill expression SPANISH,5 AND STOCKS,5 AND BONDS,2, indicating that the abilities advantageous to processing the call included a level 5 of expertise in Spanish, a level 5 of expertise in stocks, and a level 2 of expertise in bonds. If a particular agent in List A1 has a stored resume that matches each of the three levels of expertise in the three skills, a skill score of 0 will be calculated for that agent. For calls that are not "starved," both the mandatory and optional skills are considered. This may require calculation of a mandatory skill score and an optional skill score, with the cumulative skill score being the sum of the two scores.

Preferably, if a skill score is negative, it is penalized by multiplying the score by a penalty factor, e.g. −1000. Applying the penalty factor enforces the preference to have over-qualified agents, rather than under-qualified agents, handling the call. The "best skill score" is the score that is closest to 0. Scores that are above the absolute value of the penalty factor indicate under-qualified agents, and scores below the absolute value penalty factor indicate qualified or over-qualified agents. The penalty factor disqualifies any agent who does not possess a particular call-handling capability identified in the skill expression. Until the call is starved, the disqualification will occur for either a mandatory skill or an optional skill. However, after the call has waited in queue for the selected period of time, the skills identified as optional are no longer used to disqualify agents.

In step 78, List A2 is created. List A2 identifies all of the agents having the "best" skill score for the call, i.e. the score closest to 0. In step 80 a determination is made as to whether List A2 is empty. If all of the available agents of List A1 have been disqualified, the call remains in queue until other agents become available. That is, the call remains stored in queue at step 82. The call is returned to step 72 to determine whether the priority level of the call should be increased. The process can then be repeated starting at step 72.

If in step 80 it is determined that List A2 includes at least one agent who is qualified, the call is routed at step 84. For occurrences in which a number of agents are tied with the best skill score, List A2 will include all of the tied agents. In this situation, the call is routed according to the default, e.g. the call is routed at step 84 to the agent in List A2 who has been idle the longest.

Comparing FIG. 4 to the implementation of a transaction selection decision using the skills-only method, rather than temporary lists of agents at steps 74 and 78, temporary lists of transactions are created. All of the queued calls are associated with a skill expression at step 72. Again, there may be a mandatory skill expression and an optional skill expression associated with each call. Each call is also assigned a priority level and a priority class at step 72. A temporary list of all of the queued calls is created at step 74. The call-handling capabilities of the available agent are correlated with the skill expression or expressions at step 76. The transaction or transactions with the highest skill score are identified in a second temporary list at step 78. If there is a single call identified in the second list, the call is routed to the available agent at step 84. If the second temporary list includes more than one call, the call that has been in queue for the longest time will be routed to the agent at step 84. On the other hand, if no calls are contained in the second temporary list, i.e. the available agent is not qualified to handle any of the calls that are in queue, the agent remains available until a call is received for which the agent is qualified.

Comparing the steps of the skills-only method of FIG. 4 to the use of the preference-only method, only step 76 is different. At step 76, the skill levels for the call-handling capabilities of the agent are disregarded. Rather, the preferences of call-management for specific agents to handle specific calls and/or specific call types are considered in the correlation of skill expressions with agent resumes.

Figure 5:
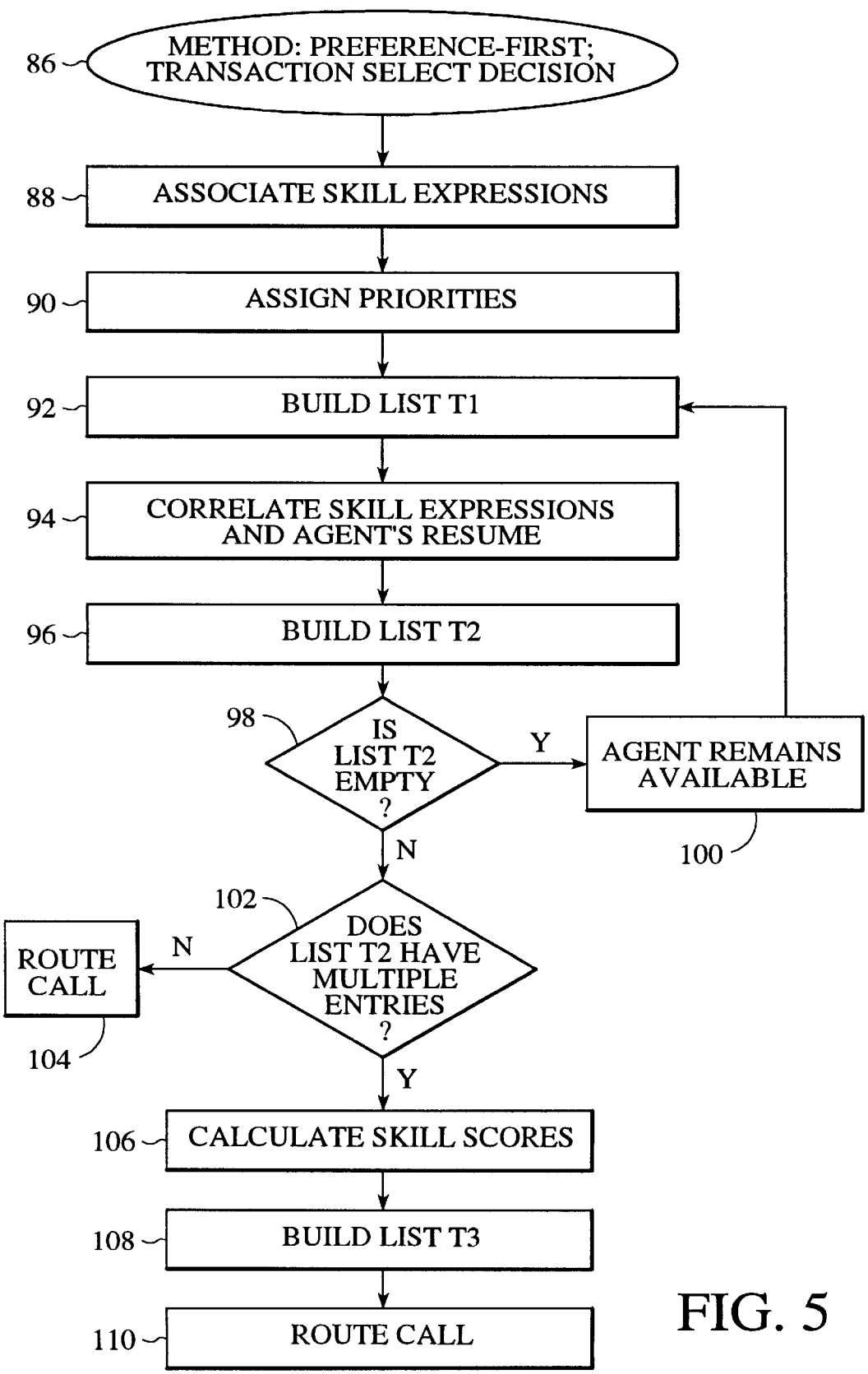
FIG. 5 is a flow chart of steps performed to execute a transaction selection decision using all portions of the agent's resume.

Referring now to FIG. 5, a preference-first, skills-second method is implemented in a transaction selection decision 86. Each of the calls that are in queue for the first available agent is associated 88 with a mandatory skill expression and an optional skill expression, if the embodiment of having two skill expressions associated with each call is utilized. Each call is also assigned 90 a priority class and a priority level. Again, the priority levels adjust in correspondence with the time in which the call is stored in queue. In another embodiment, each call is tagged with a number of skill expressions, each with a timeout value, i.e., an "expiration time." In some circumstances, the different skill expressions are unrelated to each other, such as when the preference is to route "starved" calls to a customer relations agent. With either of these embodiments, a List T1 is created at step 92 to identify all of the calls that are awaiting connection to an available agent.

When an agent terminates a call session and becomes available, the agent's resume is correlated with the skill expression or expressions of each of the calls identified in List T1. Preference scores are calculated by taking each skill in the skill expression and comparing it to the call-management preferences contained within the available agent's resume. If there are separate mandatory and optional skill expressions, the expressions are evaluated individually, with the "final" preference score being the greater of the two resulting scores, i.e. the greater of the mandatory preference score and the optional preference score. All calls that have preference scores less than the call or calls with the highest preference score are disqualified from List T1. The remaining call or calls are used to create List T2 at step 96. In step 98, the determination is made as to whether List T2 is empty. If the list is empty, the agent remains available 100. The process can be repeated starting at step 92 to determine whether a transaction has been enqueued for which the agent is qualified, or whether the priority level of a call has been reduced, so that the agent is now qualified for that call.

Still referring to the preference-first method as applied to a transaction selection decision, if at step 98 List T2 contains at least one call, a determination 102 of the number of calls in List T2 is made. If there is only one transaction identified in List T2, that call may be immediately routed to the agent at step 104, but the preferred embodiment includes executing steps 106 and 108 even though there is only one transaction. If List T2 includes multiple entries, the skill scores for the calls of List T2 are calculated 106. That is, the skill requirements of each call are compared to the available agent's call-handling capabilities with respect to the call requirements. The skill score calculation is identical to that described above. Any calls for which the agent does not qualify are eliminated and List T3 is created at step 108. If there are no entries in List T3, then none of the calls within the currently highest value of preference scores calculated in step 94 has skill requirements that are satisfied by the available agent. In one embodiment, the call of List T2 that has remained in queue for the longest time is routed to the available agent at step 110. However, the preferred embodiment restarts the process at step 92, but with the calls in List T3 being removed. That is, List T1–T3 is generated. If this new list contains no calls, then there are currently no transactions for which the agent is suitable, so that the agent remains available. On the other hand, if List T1–T3 includes at least one call, the process continues to step 94.

Returning to step 108, if List T3 includes a single call, that call is assigned to the available agent, as shown by the routing step 110. If List T3 includes more than one call, then the call which has the "best" skill score is selected. For situations in which there is a tie for the best skill score, then the call which has waited the longest in the queue is routed to the available agent.

Comparing the preference-first steps of FIG. 5 in a transaction selection decision to use of the preference-first method in an agent selection decision, steps 88 and 90 are identically implemented, but step 92 builds a List A1 of all of the available agents. The preference scores indicative of call-management preferences of the agents of List A1 to handle the available call are calculated in step 94. The call or calls having the best preference score are used to build List A2 in step 96. List A2 is a sublist of List A1.

If List A2 includes a single entry, steps 102 and 104 are executed to route the call to the selected agent of List A3. If List A2 includes multiple entries, the skill scores are calculated for the entries at step 106 and List A3 is built to identify the agent or agents having the best skill score. The call then can be routed to an agent.

In comparing the preference-first steps of FIG. 5 to execution of a skill-first method, the steps are functionally equivalent. However, rather than calculating preference scores at step 94, skill scores are calculated and rather than calculating skill scores at step 106, preference scores are calculated. The only other significant difference is that rather than potentially recirculating an agent at step 100, a call is recirculated to the step of assigning 90 priorities, so that the priority level of the call can be systematically increased.

In the preferred embodiment, the adjunct router 16 includes a report-generating component 112. A step of generating reports 114 is shown in FIG. 3. In traditional ACD environments, call-management evaluates quality of service (QoS) in order to determine whether the adequate level of staffing is provided for each static group. Staffing may be hired based upon projected size, pace and mix of the call load in order to meet service-level commitments to customers and in order to minimize the percentage of calls that are abandoned. The traditional approach is to evaluate the level of service based upon as many as four parameters. One parameter is the average time callers wait in a queue before connection to an agent. Another parameter is the percentage of calls that are answered within a defined time period. A third parameter is the percentage of calls received that are abandoned. A fourth parameter is the average time callers wait in a queue before abandoning. None of these parameters directly addresses QoS. For example, if all calls are answered within a 20 second period, but 50% of the calls are handled by under-skilled agents who are unable to meet service-level goals, the resulting poor QoS will be undetectable if evaluation is limited to analysis of the four parameters.

In addition to the QoS concern, there is an "agent utilization" concern that is not fully appreciated using prior art ACD reporting techniques. In a conventional ACD environment, call management evaluates how effectively agents utilize their call-handling capabilities by determining the percentage of the agents' available time that is spent handling calls. However, this technique does not provide any insight as to how effectively an agent handles a call for which the agent is over-skilled or under-skilled. Nor does this technique provide insights into how handling efficiency is affected when calls are handled by agents with different skill levels.

Use of the report-generating component with the server that includes the skills inventory database facilitates generating evaluations that directly address QoS and agent skill utilization concerns. In the preferred embodiment, agent summary reports, skill summary reports and match analysis reports are generated. An agent summary report relates to and is organized according to activity of particular individuals. This report covers all skill expressions for calls handled by the particular individual. The report is categorized by selected agents. The skill summary report is related to and organized according to skill expressions. This report lists all agents who were on-duty during a time period in which a call having a particular skill expression was handled by one of the agents. The report is categorized by skill expressions. The match analysis report is related to and organized according to identified agent abilities advantageous to processing calls. The match analysis report is similar to the skill summary report, but does not provide the breakdown on a per agent basis. This report shows the abandoned rate per skill expression, which skill expressions are being requested the most, and the level of service provided for each skill expression. The report is categorized by skill expressions. For all three of the reports, quality of service can be evaluated by evaluating skill scores and/or preference scores to determine the closeness in matching the call-handling requirements of calls with the call-handling capabilities of agents to whom the calls are routed.

Skill match scores are utilized in generating reports. A skill match score is the average between the skill levels requested by callers and the skill levels of the agents who are assigned to the calls. Values include "skills match under-skilled," which is the average amount agents were under-skilled during a selected time period, and "skills match over-skilled," which is the average amount agents were over-skilled. Of course, before a call is starved, it can only be associated with a skills match over-skilled value, since the call is only assigned to agents who have at least a required skill level. However, after a call is starved, both values are potentially relevant. Each call can produce both over-skilled and under-skilled values, as a call usually requires more than one skill. That is, the agent can be over-skilled for one skill and under-skilled for another.

Preference match scores may also be utilized in generating the reports. A preference match score is the average preference score that agents have for calls that are assigned to the agents. As with the preference score, a high preference match score indicates success in matching calls to agents based on preference. Preference match scores consist of two values. A first value is the preference match normal, which is the average preference score that agents have for calls that are assigned to them before the calls become starved. The preference match starved is the average preference score that agents have for calls that are assigned to them after the calls become starved. Thus, separate evaluations can be generated for unstarved and starved QoS service levels.

We claim:

1. A call-management method of distributing calls of a common pool of calls to a plurality of individuals comprising steps of:

assigning and storing first data indicative of proficiencies of at least one call-handling capability of each of said individuals with respect to processing various types of calls from said common pool, including assigning proficiency indicators to each said individual, each proficiency indicator being related to a different call-handling capability within a defined set of call-handing capabilities;

assigning and storing second data indicative of call-management preferences for particular individuals to process particular types of calls from said common pool, including assigning preference indicators to said individuals based upon said preferences, each said individual thereby being associated with individualized first and second data that are indicative of said proficiencies and said preferences with respect to said each individual;

assigning said plurality of individuals to handling said calls of said common pool of calls;

for each call that is to be distributed from said common pool, associating said call with an identification of at least one call-handling capability advantageous to processing said call;

in response to said identification of said at least one call-handling capability advantageous to processing said call, correlating at least one of said first data and said second data of said plurality of individuals with said identification as a basis for routing decisions regarding to which individual said call should be routed; and routing said call in accordance with said routing decisions.

2. The method of claim 1 wherein said steps of storing said first data indicative of said proficiencies and storing said second data indicative of call-management preferences include forming a resume for each of said individuals, such that forming said resume for an individual includes determining levels of proficiencies and levels of call-management preferences for said various types of calls.

3. The method of claim 1 further comprising a step of enabling switching among said first data, said second data and a combination of said first and second data as said basis for said routing decisions.

4. The method of claim 1 wherein said step that includes correlating at least one of said first and second data with said identification further includes assigning a first one of said first and second data as a primary basis for said routing decisions and utilizing a second one of said first and second data as a secondary basis for said routing decisions when said primary basis fails to reduce a routing decision to a single selection of one of said individuals.

5. The method of claim 2 further comprising a step of generating quality of service reports indicative of effectiveness of said call-management method, including generating reports of the closeness of matching call requirements with levels of proficiencies of said individuals, including determining a score for each call routed to one of said individuals, wherein said score is based upon a comparison of desired levels of proficiencies for handling said call and the levels of proficiencies stored in said resume for the individual to whom said call is routed.

6. The method of claim 1 further comprising a step of organizing said individuals in a single group of automatic call distribution agents such that any placement of a call in a queue is unrelated to said step of associating at least one call-handling capability advantageous to processing said call, such that fixed groupings of said individuals according to said proficiencies are unnecessary.

7. The method of claim 1 wherein said steps of storing said first and second data are steps of storing information in an adjunct server that is connected to call switching circuitry that is utilized in said step of routing said calls.

8. The method of claim 1 wherein said step of associating at least one call-handling capability is a step of identifying multiple call-handling capabilities advantageous to processing said call, and wherein said routing decisions are simultaneously responsive to each of said multiple call-handling capabilities, thereby establishing a process in which routing calls to said individuals is at least partially based upon utilizing a logical operative "AND" for said multiple call-handling capabilities.

9. The method of claim 8 wherein said process further includes basing said routing upon utilizing logical operatives "OR" and "NOT," wherein utilizing said logical operative "OR" selects said individual upon determining that said individual has at least one of two call-handling capabilities indicated by said first and second data, and wherein utilizing said logical operative "NOT" disqualifies individuals having a particular call-handling capability.

10. A call-management method of distributing calls to automatic call distribution (ACD) agents comprising steps of:

forming a resume database in which each of said ACD agents is rated with respect to a plurality of skills associated with efficient handling of calls, said ratings being indicative of skill levels;

for each call, determining which of said skills is relevant to efficient handling of said call, including associating a skill expression with said call such that said skill expression has capacity for identifying a plurality of relevant skills and skill levels;

for occasions upon which an available call is to be routed to one of a plurality of available ACD agents, utilizing said associated skill expression of identified relevant skills to select a particular available ACD agent and then routing said available call to said particular available ACD agent, said utilization of said skill expression including collectively applying more than one relevant skill to selecting said particular available ACD agent when said associated skill expression identifies a plurality of relevant skills; and for occasions upon which a single ACD agent is available for a plurality of queued calls, utilizing said associated skill expressions of said plurality of queued calls in a selection of which one of said queued calls is to be routed to said single ACD agent and then routing said selected queued call to said single ACD agent, said utilization of said skill expression including comparing said identified relevant skills of said skill expressions with said ratings stored within said resume database.

11. The method of claim 10 further comprising defining sequence timeout skill expressions for a call, such that each timeout skill expression in said sequence is utilized in routing said call after expiration of a preselected time period since a previous skill expression in said sequence was implemented, wherein each timeout skill expression is optionally unrelated to said relevant skills identified in prior skill expressions of said sequence.

12. The method of claim 10 wherein said step of associating a skill expression with each call includes designating at least one skill that is relevant to handling of said call as a skill that an ACD agent must possess in order to handle said call, said step of associating a skill expression further including enabling designation of relevant skills as optional with respect to selection of an ACD agent.

13. The method of claim 11 wherein said step of associating skill expressions with calls includes utilizing logical operatives "AND," "OR" and "NOT" with respect to relevant skills for efficient handling of said calls, said logical operatives determining application of said relevant skills in selecting ACD agents to handle said calls.

14. An automatic call distribution (ACD) system for distributing transactions among a plurality of ACD agents comprising:

call switching circuitry for routing said transactions;

a transaction queue for storing said transactions in common for distribution among said ACD agents, with each transaction being associated with an expression indicative of (1) a skill level of a transaction-handling skill relevant to efficient handling of said transaction and (2) a preference level of a preference in selection of an ACD agent having said transaction-handling skill to handle said transaction;

a server electronically connected to said call switching circuitry for transmission of data between said server and said call switching circuitry, said server having a stored resume database of transaction-handling skills of each of said ACD agents, said server further having a stored preference database of transaction-management preferences in selection of ACD agents in accordance with information related to types of transactions, said resume database including identifications of at least three levels of skill for said transaction-handling skills for each ACD agent and said preference database including identifications of at least three levels of preference for said transaction-management preferences with respect to each of said ACD agents, both of said indications of levels of skill and levels of preference being specific to individual ACD agents; and a transaction dispatcher means for selecting a particular one of said ACD agents to handle a particular one of said transactions stored in said transaction queue in response to a comparison between said expression associated with said particular one of said transactions and database information of said server.

15. The ACD system of claim 14 further comprising means for forming said expressions associated with said transactions in response to caller queries.

16. The ACD system of claim 15 wherein said means for forming said expressions includes means for utilizing logical operatives "AND," "OR" and "NOT" in formation of said expressions to identify relevant skills and preferences for handling transactions.

17. The ACD system of claim 14 further comprising election means for electing among applying said resume database, said transaction-management database and a combination of said resume and transaction-management databases to said transaction dispatcher means for said comparison with said transactions.

18. The ACD system of claim 14 further comprising a means for generating quality of service reports indicative of effectiveness of call-management, including generating reports of the closeness of matching said levels of skills of said ACD agents with said expressions of skill relevant to efficient handling of said transactions, wherein a score is determined for each call routed to an ACD agent and said score is indicative of said closeness of matching.

19. The ACD system of claim 14 wherein all of said ACD agents are organized in a single group for handling transactions from a single transaction queue.

* * * * *

UNITED STATES PATENT AND TRADEMARK OFFICE
CERTIFICATE OF CORRECTION

PATENT NO. : 5,825,869
DATED : October 20, 1998
INVENTOR(S) : Nancy Sinling Brooks, Paul Douglas Fryer, Gary Stanley Kaufman, Stephen Phillip Berkson, Charles R. Herel and Laura M. Brooks It is certified that error appears in the above-identified patent and that said Letters Patent is hereby corrected as shown below:

Title page,
Item [73], add Assignee: -- International Business Machines Corporation, Ontario, Canada --

Signed and Sealed this

Seventh Day of May, 2002

Attest:

Attesting Officer

JAMES E. ROGAN
*Director of the United States Patent and Trademark Office*